(12) United States Patent
Nicholas et al.

(10) Patent No.: US 11,415,539 B2
(45) Date of Patent: Aug. 16, 2022

(54) CHEMICAL OXYGEN DEMAND SENSING USING PSEUDO-GRAPHITE

(71) Applicants: ABB Schweiz AG, Baden (CH); University of Idaho, Moscow, ID (US)

(72) Inventors: Nolan Nicholas, Granby, CT (US); Ignatius Cheng, Moscow, ID (US); Haoyu Zhu, Moscow, ID (US); Humayun Kabir, Moscow, ID (US)

(73) Assignees: ABB Schweiz AG, Baden (CH); University of Idaho, Moscow, ID (US)

( * ) Notice: Subject to any disclaimer, the term of this patent is extended or adjusted under 35 U.S.C. 154(b) by 0 days.

(21) Appl. No.: 16/292,317

(22) Filed: Mar. 5, 2019

(65) Prior Publication Data
US 2020/0284747 A1 Sep. 10, 2020

(51) Int. Cl.
*G01N 27/30* (2006.01)
*G01N 27/416* (2006.01)

(52) U.S. Cl.
CPC ....... *G01N 27/308* (2013.01); *G01N 27/4166* (2013.01)

(58) Field of Classification Search
CPC .. G01N 27/327; G01N 33/543; G01N 33/806; G01N 33/1866; C12Q 1/00; Y02E 60/527; H01M 8/16
See application file for complete search history.

(56) References Cited

U.S. PATENT DOCUMENTS

| | | | |
|---|---|---|---|
| 4,725,422 A | 2/1988 | Miyabayashi et al. | |
| 5,290,592 A | 3/1994 | Izuchi et al. | |
| 5,571,638 A | 11/1996 | Satoh et al. | |
| 7,442,358 B2 | 10/2008 | Sano et al. | |
| 9,691,556 B2 | 6/2017 | Cheng et al. | |
| 2005/0079119 A1 | 4/2005 | Kawakami et al. | |
| 2006/0062713 A1 | 3/2006 | Sano et al. | |
| 2006/0062715 A1 | 3/2006 | Endo et al. | |
| 2006/0121279 A1 | 6/2006 | Petrik | |
| 2007/0092432 A1 | 4/2007 | Prud'Homme et al. | |
| 2009/0068471 A1 | 3/2009 | Choi et al. | |
| 2009/0155561 A1 | 6/2009 | Choi et al. | |
| 2012/0228555 A1 | 9/2012 | Cheng et al. | |
| 2012/0304743 A1* | 12/2012 | Rajasekharan | G01N 27/07 73/61.41 |
| 2014/0001047 A1 | 1/2014 | Kahn et al. | |
| 2014/0111906 A1 | 4/2014 | Eilertsen | |
| 2015/0377824 A1 | 12/2015 | Ruhl et al. | |
| 2017/0008825 A1 | 1/2017 | Johnson et al. | |
| 2017/0169959 A1 | 6/2017 | Cheng et al. | |
| 2018/0224390 A1 | 8/2018 | Pan et al. | |
| 2018/0362349 A1 | 12/2018 | Zhong et al. | |
| 2019/0041356 A1 | 2/2019 | Pan et al. | |
| 2019/0079043 A1 | 3/2019 | Johnson, Jr. et al. | |
| 2020/0284747 A1 | 9/2020 | Nicholas et al. | |
| 2020/0284748 A1 | 9/2020 | Nicholas et al. | |
| 2020/0284749 A1 | 9/2020 | Nicholas et al. | |
| 2020/0284750 A1 | 9/2020 | Nicholas et al. | |
| 2020/0284751 A1 | 9/2020 | Nicholas et al. | |
| 2020/0284755 A1 | 9/2020 | Nicholas et al. | |

FOREIGN PATENT DOCUMENTS

| | | |
|---|---|---|
| CN | 1715899 A | 4/2006 |
| CN | 107017270 A | 8/2017 |
| EP | 0165047 A2 | 12/1985 |
| JP | 2017027919 A | 2/2017 |
| KR | 20100118808 A | 11/2010 |
| KR | 1020110069458 A | 6/2011 |
| RU | 2163375 C2 | 2/2001 |
| WO | 1998/020331 A1 | 1/1998 |
| WO | 2001/064938 A2 | 9/2001 |
| WO | 2002/082069 A1 | 10/2002 |
| WO | WO2014116026 A1 | 7/2014 |

OTHER PUBLICATIONS

Gyan et al., Microchemical Journal, 2015, 122, 39-44 (Year: 2015).*
Supplemental Information (Year: 2015).*
ISA/RU, International Search Report and Written Opinion for Related PCT International Patent Application No. PCT/US2020/021130, dated Jun. 18, 2020, 8 pages.
ISA/RU, International Search Report and Written Opinion for Related PCT International Patent Application No. PCT/US2020/021137, dated Jun. 18, 2020, 8 pages.
ISA/RU, International Search Report and Written Opinion for Related PCT International Patent Application No. PCT/US2020/021145, dated Jun. 18, 2020, 8 pages.
ISA/RU, International Search Report and Written Opinion for Related PCT International Patent Application No. PCT/US2020/021149, dated Jun. 11, 2020, 6 pages.
Humayun Kabir et al., "The sp2-sp3 carbon hybridization content of nanocrystalline graphite from pyrolyzed vegetable oil, comparison of electrochemistry and physical properties with other carbon forms and allotropes," Carbon, vol. 144, Apr. 2019, pp. 831-840.
Minhua Shao et al., "Recent Advances in Electrocatalysts for Oxygen Reduction Reaction," Chemical Reviews, vol. 116(6), Feb. 17, 2016, pp. 3594-3657.
Andrew A. Gewirth et al., "Nonprecious Metal Catalysts for Oxygen Reduction in Heterogeneous Aqueous Systems," Chemical Reviews, vol. 118(5), Jan. 31, 2018, pp. 2313-2339.
Subal Dey et al., "Molecular electrocatalysts for the oxygen reduction reaction," Nature Reviews Chemistry, vol. 1(98), Dec. 6, 2017, pp. 1-20.
Olga Naumov et al., "The stability limits of highly active nitrogen doped carbon ORR nano-catalysts: a mechanistic study of degradation reactions," Nanoscale, vol. 10(14), Mar. 1, 2018, pp. 6724-6733.
Yanguang Li et al., "Metal-Air Batteries: Will They Be the Future Electrochemical Energy Storage Device of Choice?," ACS Energy Letters, vol. 2(6), May 5, 2017, pp. 1370-1377.

(Continued)

*Primary Examiner* — Gurpreet Kaur
(74) *Attorney, Agent, or Firm* — Armstrong Teasdale LLP

(57) ABSTRACT

Methods, electrodes, and sensors for pH sensing using pseudo-graphite are disclosed. In one illustrative embodiment, a method may include coating a pseudo-graphite material onto a surface of an electrode substrate to produce a pseudo-graphite surface. The method may also include exposing the pseudo-graphite surface to a sample to detect organic content in the sample.

21 Claims, 10 Drawing Sheets

(56) References Cited

OTHER PUBLICATIONS

Bin Xu et al., "Modification of vertically aligned carbon nanotubes with RuO2 for a solid-state pH sensor," Electrochimica Acta, vol. 55(8), Mar. 1, 2010, pp. 2859-2864.
Tong-Shen Liu et al., "Au—Fe(III) nanoparticle modified glassy carbon electrode for electrochemical nitrite sensor," Journal of Electroanalytical Chemistry, vol. 632(1-2) Jul. 1, 2019, pp. 197-200.
Kristin R. Kneten et al., "Effects of Redox System Structure on Electron-Transfer Kinetics at Ordered Graphite and Glassy Carbon Electrodes," Analytical Chemistry, vol. 64(21), Nov. 1, 1992, pp. 2518-2524.
Claudia C. Villarreal et al., "Carbon allotropes as sensors for environmental monitoring," Current Opinion in Electrochemistry, vol. 3(1), Jun. 2017, pp. 106-113.
Kevin W. Hathcock et al., "Incipient Electrochemical Oxidation of Highly Oriented Pyrolytic Graphite: Correlation between Surface Blistering and Electrolyte Anion Intercalation," Analytical Chemistry, vol. 67(13), Jul. 1, 1995, 2201-2206.
Paul K. Chu et al., "Characterization of amorphous and nanocrystalline carbon films," Materials Chemistry and Physics, vol. 96(2-3), Apr. 10, 2006, pp. 253-277.
Isaiah O. Gyan et al., "A Study of the Electrochemical Properties of a New Graphitic Material: Guitar," ChemElectroChem, vol. 2(5), Feb. 12, 2015, pp. 700-706.
Zhen Yuan Xia et al., "Synergic Exfoliation of Graphene with Organic Molecules and Inorganic Ions for the Electrochemical Production of Flexible Electrodes," ChemPlusChem, vol. 79(3), Jan. 29, 2014, pp. 439-446.
"Carbon Nanotube | Purity | Evaluation of Purity and Heat Resistance," Schmadzu, online at https://www.shimadzu.com/an/industry/ceramicsmetalsmining/0102005.html, downloaded Oct. 10, 2019, 4 pages.
B. Rösner et al., "Dispersion and characterization of arc discharge single-walled carbon nanotubes—towards conducting transparent films," Nanoscale, vol. 6(7), Jan. 14, 2014, pp. 3695-3703.
So Yeun Kim et al., "Facile Synthesis of Carbon-Coated Silicon/Graphite Spherical Composites for High-Performance Lithium-Ion Batteries," ACS Applied Materials & Interfaces, vol. 8(19), Apr. 26, 2016, p. 12109-12117.
Konstantinos Spyrou et al., "A novel route towards high quality fullerene-pillared graphene," Carbon, vol. 61, Sep. 2013, pp. 313-320.
Jarmila Vilčáková et al., "Effect of Surfactants and Manufacturing Methods on the Electrical and Thermal Conductivity of Carbon Nanotube/Silicone Composites," Molecules, vol. 17(11), Nov. 5, 2012, pp. 13157-13174.

Shuai Chen et al., "Branched CNT@SnO2 nanorods@carbon hierarchical heterostructures for lithium ion batteries with high reversibility and rate capability," Journal of Materials Chemistry A, vol. 2(37), Jul. 22, 2014, pp. 15582-15589.
Franco Cataldo, "A Study on the Thermal Stability to 1000° C. of Various Carbon Allotropes and Carbonaceous Matter Both Under Nitrogen and in Air," Fullerenes, Nanotubes and Carbon Nanostructures, vol. 10(4), Dec. 2002, pp. 293-311.
Xin Li et al., "Fabrication of ZnO nanowires array with nanodiamond as reductant," RSC Advances, vol. 6(99), Sep. 27, 2016, pp. 96479-96483.
Reeti Bajpai et al., "Rapid growth of onion-like carbon nanospheres in a microwave oven," CrystEngComm, Nov. 13, 2015, vol. 18(2), pp. 230-239.
R.I.R. Blyth et al., "XPS studies of graphite electrode materials for lithium ion batteries," Applied Surface Science, Oct. 16, 2000, vol. 167(1-2), pp. 99-106.
Jessica Campos-Delgado et al., "Bulk Production of a New Form of sp2 Carbon: Crystalline Graphene Nanoribbons," Nano Letters, Aug. 14, 2008, vol. 8(9), pp. 2773-2778.
Frank Cheng, "Guitar: A New Material For Dimensionally Stable Anodes," Seminar Given To Washington State University Department of Civil and Environmental Engineering, May 2012, published online at https://www.webpages.uidaho.edu/ifcheng/recent_seminars_and_presentation.htm, 96 pages.
Frank Cheng et al., "Guitar: A New Material For Dimensionally Stable Anodes," Paper No. 19649, 244th American Chemical Society National Meeting, Philadelphia, PA, Aug. 2012, published online at https://www.webpages.uidaho.edu/ifcheng/recent_seminars_and_presentation.htm, 69 pages.
I. Francis Cheng et al., "Highest measured anodic stability in aqueous solutions: graphenic electrodes from the thermolyzed asphalt reaction," RSC Advances, Feb. 21, 2013, vol. 3(7), pp. 2379-2384.
I. Francis Cheng et al., "Synthesis of graphene paper from pyrolyzed asphalt," Carbon, Jul. 2011, vol. 49(8), pp. 2852-2861.
Henriette Estrade-Szwarckopf, "XPS photoemission in carbonaceous materials: A "defect" peak beside the graphitic asymmetric peak," Carbon, Dec. 2004, vol. 42(8-9), pp. 1713-1721.
Yuqun Xie et al., "Sulfur as an important co-factor in the formation of multilayer graphene in the thermolyzed asphalt reaction," Journal of Materials Chemistry, Mar. 28, 2012, vol. 22(12), pp. 5723-5729.
Ashleigh Anderson et al., "Investigating the Use of Endogenous Quinoid Moieties on Carbon Fibre as Means of Developing Micro pH Sensors," Materials Science and Engineering C, 2014, 533-537, 2014.
Tomei et al., "Carbon black-based disposable sensor for an on-site detection of free chlorine in swimming pool water", Talanta, 189, 2018, 262-267. (Year: 2018).

* cited by examiner

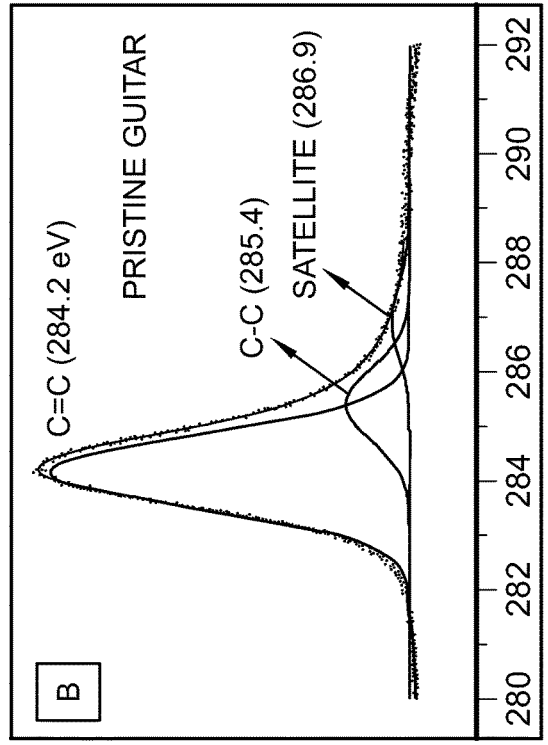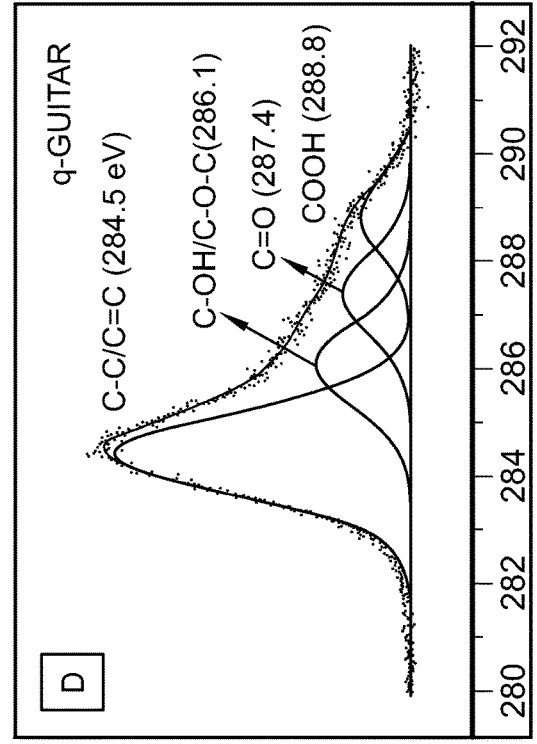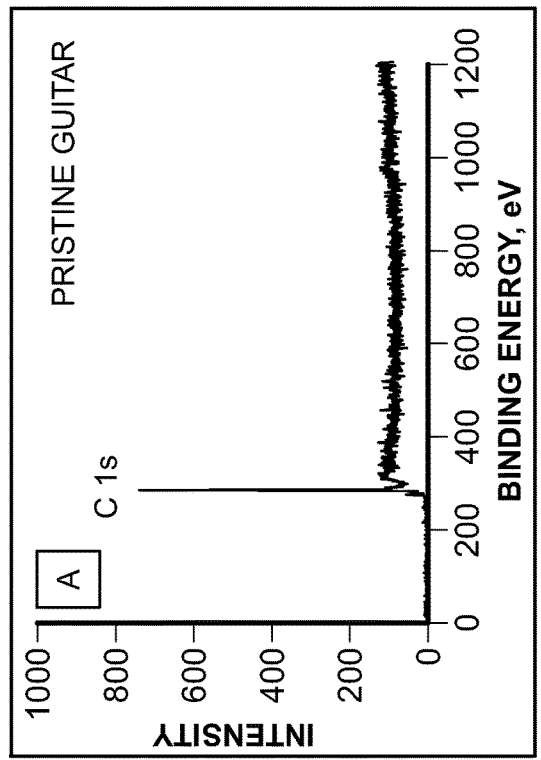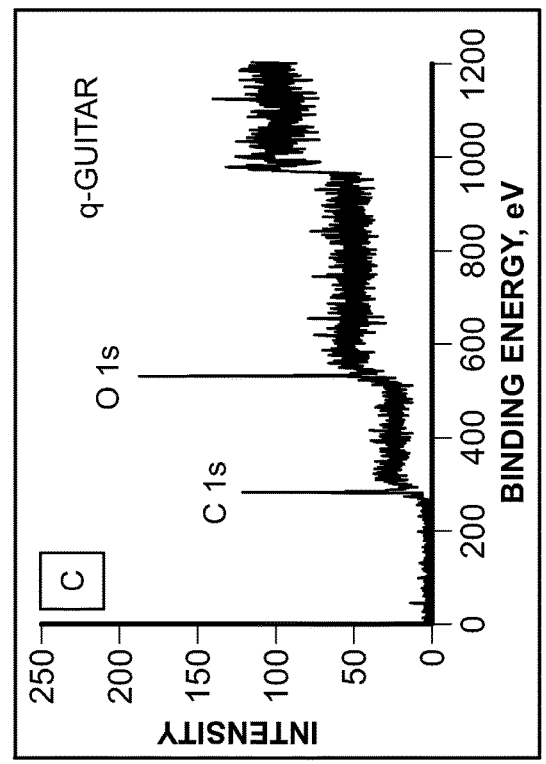
FIG. 6

| MATERIAL | OXYGEN (%) | CARBON (%) | | | C/O ATOMIC RATIO | REF. |
|---|---|---|---|---|---|---|
| | | TOTAL CARBON (%) | sp²-C (%) | sp³-C (%) | | |
| GUITAR | - | 100.0 | 85.0 | 15.0 | N/A | THIS WORK |
| q-GUITAR | 41.0 | 59.0 | - | - | 1.4/1 | THIS WORK |
| GRAPHITE | 3.4 | 96.6 | 80.0 | 20.0 | 28.4/1 | 22 |
| REDUCED GRAPHENE OXIDES | 3.0 | 97.0 | 75.0 | 25.0 | 32.3/1 | 22 |
| | 8.8 | 91.2 | 90.0 | 10.0 | 10.3/1 | 23 |
| | 16.6 | 83.4 | - | - | 5/1 | 24 |
| | 20.0 | 80.0 | 70.0 | 30.0 | 4/1 | 25 |
| GRAPHENE OXIDES | 25.6 | 74.4 | 77.8 | 22.2 | 2.9/1 | 26 |
| | 27.0 | 73.0 | 70.0 | 30.0 | 2.7/1 | 23 |
| | 32.5 | 67.5 | 40.0 | 60.0 | 2.1/1 | 22 |
| | 33.3 | 66.7 | 46.0 | 54.0 | 2/1 | 25 |
| | 43.8 | 56.2 | - | - | 1.3/1 | 24 |

FIG. 7

| MATERIAL | ANALYTE | POTENTIAL* (V) | LINEAR RANGE (mg/L) | LOD (mg/L) | SENSITIVITY (µA-L/mg-cm2) | N | Cl- TOLERANCE (mg/L) | REF. |
|---|---|---|---|---|---|---|---|---|
| q-GUITAR | GLUCOSE | 1.6 | 0-10000 | 40 | 0.032 | ≈10 | 100 | THIS WORK |
| | KHP | | 0-9000 | 33 | 0.038 | | | |
| | SDBS | | 0-5000 | 36 | 0.035 | | | |
| | LACTIC ACID | | 0-7000 | 27 | 0.046 | | | |
| BORON DOPED DIAMOND (BDD) | MIXTURE OF GLUCOSE, KHP, ETHANOL, 4-HYDROXYBENZOIC ACID, GLUTAMIC ACID, ACETIC ACID, ACETONE, SUCROSE, PHENOL | 2.8 | 2-175 | 1 | 0.5 | 500 | 0 | 36 |
| | GLUCOSE, KHP,GLUTAMIC ACID, PHENOL, OXALIC ACID, p-NITROPHENOL, ACETIC ACID, CYSTEAMINE, SALICYLIC ACID | 2.5 | 20-9000 | 7.5 | 7.6 | 400 | - | 43,11 |
| | KHP, GLUCOSE | 1.6 | 0-232 | 0.2 | 1.5 | - | - | 44 |
| Ti/TiO₂ | KHP, PHENOL | 2.0 | 25-530 | | 0.1 | - | - | 18 |
| PbO₂/GRAPHITE | GLUCOSE, KHP | 1.5 | 200-6000 | | 0.005 | - | - | 33 |
| F-PbO₂/Pt | GLUCOSE | 1.3 | 100-1200 | 15 | 0.008 | 650 | Co-/COD <2.5 | 19 |
| Cu NPs/Cu DISC | GLYCINE | 0.8 | 4.8-600 | 3.6 | 6.4 | | 700 | 5 |
| CoO/GLASSY CARBON | | 0.8 | 17-170 | 1.1 | 14.2 | 1 | 700 | 17 |
| Cu-Ni NPS/ MWCNT | | 0.75 | | 21 | 0.91 | | | |
| CuO-AgO NPs/ MWCNT | GLUCOSE | | 106-1292 | 28 | 0.027 | | - | 16 |
| CoO NPs/ MWCNT | | | | 36 | 0.61 | | | |
| Ni NPs/ MWCNT | | | | 58 | 0.16 | | | |
| Cu/CuO | GLUCOSE | 0.7 | 53-2800 | 20.3 | 4.8 | 150 | - | 45 |
| Cu-Co NPs/Au | GLUCOSE | 0.6 | 2-768 | 0.6 | 12.6 | | 700 | 46 |
| Ni NPs/GLASSY CARBON | GLUCOSE, PHENOL, LACTOSE, CITRIC ACID, ANILINE, ETHANOL, GLYCOSE, PYRROLE | 0.5 | 10.-533 | 1.1 | 0.8 | 35 | 700 | 6 |
| | GLYCINE | 0.4 | 0.2-480 | 0.14 | 16.3 | | 3500 | 47 |

*FIG. 10*

CHEMICAL OXYGEN DEMAND SENSING USING PSEUDO-GRAPHITE

CROSS-REFERENCE TO RELATED APPLICATIONS

This application is related to U.S. patent application Ser. No. 16/292,318 (titled "Chlorine Species Sensing Using Pseudo-Graphite"), Ser. No. 16/292,320 (titled "pH Sensing Using Pseudo-Graphite"), Ser. No. 16/292,322 (titled "Technologies Using Pseudo-Graphite Composites"), Ser. No. 16/292,323 (titled "Technologies Using Nitrogen-Functionalized Pseudo-Graphite"), and Ser. No. 16/292,325 (titled "Technologies Using Surface-Modified Pseudo-Graphite"), all of which were filed on Mar. 5, 2019, by the co-applicants of the present application. The disclosures of the foregoing patent applications are all incorporated herein by reference in their entirety.

BACKGROUND

The present disclosure relates to chemical oxygen demand (COD) sensing using pseudo-graphite, and more particularly to the utilization of pseudo-graphite electrodes for detecting organic content.

Chemical oxygen demand (COD) is a key aspect of water quality in various aqueous stream processing applications. COD is a measure of the organic content of the system. COD measures how much oxygen would be required to eliminate the organic content from an aqueous stream. COD is currently measured by several methods and most commonly it is measured by extracting a sample from an aqueous stream and applying a strong oxidizing substance, such as a dichromate, and measuring how much of the oxidizing substance is consumed to oxidize the carbon in the aqueous stream. Electrochemical methods are attractive for replacing such methods for various reasons such as the elimination of the need for oxidizing reagents, which are often toxic and which are process consumables that increase the complexity and maintenance needs for measurement devices.

Electrochemical methods for performing this process require electrodes which are resilient with respect to the conditions required to perform the oxidation process. Due to the high potentials needed to ensure complete and efficient oxidation of the hydrocarbons in the aqueous stream, materials which provide effective function as a dimensionally stable anode are required. Boron doped diamond (BDD) has previously been used. However, higher heterogeneous electron transfer coefficients, higher conductivity and lower cost are desired while possessing similar corrosion resistance properties.

SUMMARY

The present disclosure includes one or more of the features recited in the appended claims and/or the following features which, alone or in any combination, may comprise patentable subject matter.

According to an aspect of the disclosed embodiments, a method may include coating a pseudo-graphite electrode material onto a surface of an electrode substrate to produce a pseudo-graphite surface. The method may also include exposing the pseudo-graphite surface to a sample to detect organic content in the sample.

In some embodiments, the method may include modifying the pseudo-graphite surface with an electrochemically sensitive chemistry to alter a sensing property of the electrode to enhance the detection of organic content. Modifying the pseudo-graphite surface may include coating the pseudo-graphite surface with tin-oxide to enhance the electrode for detecting organic content. Modifying the pseudo-graphite surface may include oxidizing the pseudo-graphite surface to produce oxygen bearing groups to enhance the electrode for detecting organic content. Modifying the pseudo-graphite surface may include grafting the pseudo-graphite surface with cyclopropyl groups to enhance the electrode for detecting organic content. Modifying the pseudo-graphite surface may include grafting the pseudo-graphite surface with diamond-like carbon to enhance the electrode for detecting organic content. Modifying the pseudo-graphite surface may include covering the pseudo-graphite surface with tin oxide nanoparticles to produce a decorated surface, and oxidizing the decorated surface.

Optionally, the pseudo-graphite may have fast heterogeneous electron transfer at a basal plane. The pseudo-graphite may have a corrosion resistance greater than graphitic materials. A carbon content of the pseudo-graphite may include 80-90% sp2 carbon and 10-20% sp3 carbon.

According to another aspect of the disclosed embodiments, an electrode may include an electrode substrate with a surface. A pseudo-graphite electrode material may be coated onto the surface of the electrode substrate to produce a pseudo-graphite surface for detecting organic content.

In some embodiments, the pseudo-graphite surface may be modified with an electrochemically sensitive chemistry to alter a sensing property of the electrode to enhance the electrode for detecting organic content. The pseudo-graphite surface may be coated with tin-oxide to enhance the electrode for detecting organic content. The pseudo-graphite surface may be oxidized to produce oxygen bearing groups to enhance the electrode for detecting organic content. Diamond-like carbon may be grafted onto the pseudo-graphite surface to enhance the electrode for detecting organic content. The pseudo-graphite surface may be modified through a Kolbe-radical grafting reaction to enhance the electrode for detecting organic content. The pseudo-graphite surface may be covered with tin oxide nanoparticles to produce a decorated surface. The decorated surface may be oxidized.

According to yet another aspect of the disclosed embodiments, a sensor may include an electrode having an electrode substrate and a pseudo-graphite material coated onto a surface of the electrode substrate to produce a pseudo-graphite surface. The pseudo-graphite surface of the electrode may be exposed to a sample to detect organic content in the sample. An electrical source may supply at least one of a current or voltage to the electrode. A measurement circuit may measure a resultant signal from the electrode.

Optionally, the pseudo-graphite surface may be modified with an electrochemically sensitive chemistry to alter a sensing property of the electrode to enhance the electrode for detecting organic content. The electrode may be a first electrode configured to detect a first organic content. The sensor may also include a second electrode configured to detect a second organic content.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. The detailed description particularly refers to the accompanying figures in which:

FIG. 6 includes two graphs (A and B) of XPS spectra on pristine pseudo-graphite and two graphs (C and D) of XPS spectra of q-pseudo-graphite, wherein formation of q-pseudo-graphite is achieved by: +2.1 V applied for 150 sec followed by 15 cyclic voltammetric cycles from −0.7 V to +1.0 V at 50 mV/s in 1.0 M H2SO4 on pristine pseudo-graphite;

FIG. 7 is a table showing a comparison of surface oxides content of pseudo-graphite and q-pseudo-graphite with graphite, reduced graphene and graphene oxides as measured by XPS;

FIG. 10 is a table illustrating a Comparison of linear range, limit of detection (LOD), sensitivity, stability (number of measurements, n) and Cl— tolerance of q-pseudo-graphite with literature COD sensor electrodes;

DETAILED DESCRIPTION OF THE DRAWINGS

Figure 1:
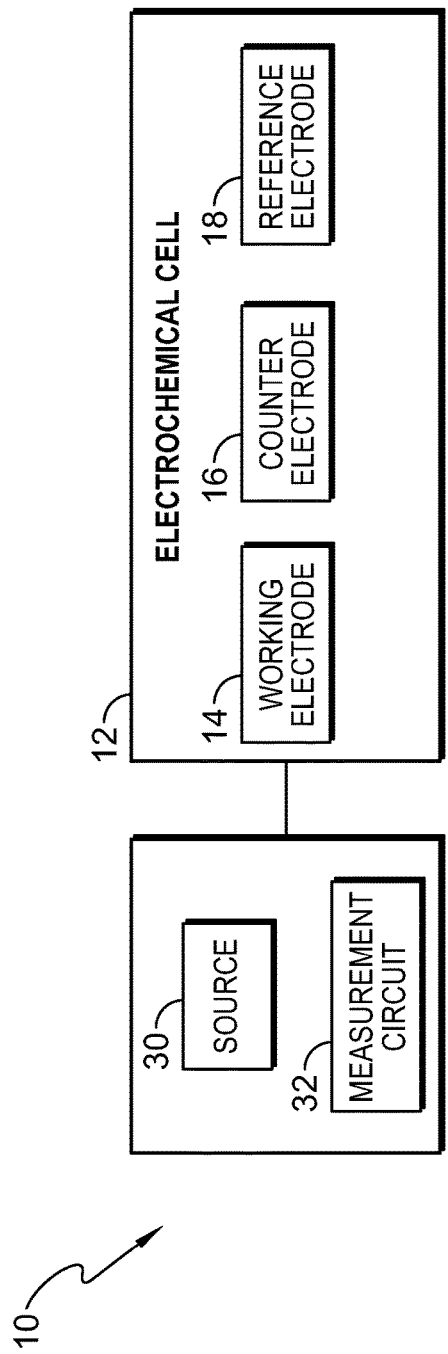
FIG. 1 is a schematic view of a sensor device in accordance with an embodiment.

While the concepts of the present disclosure are susceptible to various modifications and alternative forms, specific embodiments thereof have been shown by way of example in the figures and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring to FIG. 1, in one illustrative embodiment, a sensor device 10 includes an electrochemical cell 12 configured to be positioned within a liquid having a chemical species. The electrochemical cell 12 houses a working electrode 14, a counter electrode 16, and a reference electrode 18. In some embodiments, the electrochemical cell 12 only houses the working electrode 14 and the counter electrode 16, and does not include a reference electrode 18. In other embodiments, the reference electrode 18 and working electrode 14 may be combined into a single electrode. The working electrode 14 is electrically coupled to a source 30. The source 30 may be a current source or a voltage source. Each electrode 14, 16, 18 is coupled to a measuring circuit 32 that is configured to measure current or voltage, depending on the type of source 30.

In an embodiment where the source 30 is a current source, the source 30 applies a known current to the working electrode 14. The measuring circuit 32 detects a resultant current between the working electrode 14 and the counter electrode 16. By comparing the resultant current to a current at the reference electrode 18, a concentration of chemical species in the liquid may be detected.

In an embodiment where the source 30 is a voltage source, the source 30 applies a known voltage to the working electrode 14 that is held at a controlled potential relative to a reference. The measuring circuit 32 detects a resultant voltage or current between the working electrode 14 and the counter electrode 16. By comparing the resultant voltage to a voltage at the reference electrode 18, a concentration of chemical species in the liquid may be detected.

Figure 2:
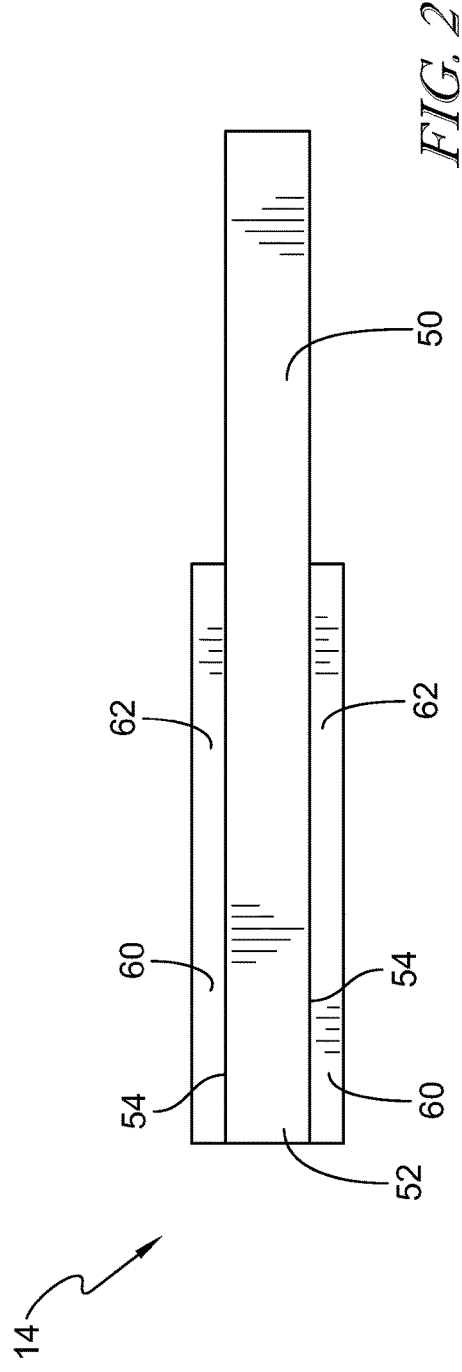
FIG. 2 is a cross-sectional view of the working electrode shown in FIG. 1.

Referring now to FIG. 2, in one illustrative embodiment, the working electrode 14 includes a substrate 50 having at least one surface 52 with a coatable surface 54. In some embodiments, the electrode 14 is a composite electrode. The coatable surface 54 may be selected from at least one of nanosprings, nanotubes, diatomites, a metal, glass, mica, germanium, and silicon (including porous high surface area electrochemically etched silicon). The metal may be selected from copper or iron. The coatable surface 54 may possess suitable thermal stability, chemical stability at fabrications temperatures and surface chemistry to have a pseudo-graphite applied thereon. The coatable surface 54 may also have relatively low thermal expansion between the deposition conditions and room temperature. For synthesis/fabrication purposes this includes stable ceramics such as $SiO_2$ (which includes micro- and nano-sized structures such as nanosprings and diatomites), as well as other ceramics like $Al_2O_3$ (including halloysite and anodized aluminum oxide membranes), MgO, iron oxides, silicon, cenospheres, and the like. It also includes suitable carbons such as graphite fibers and carbon black and some high temperature tolerant metals such as tungsten and molybdenum. A pseudo-graphite 54 is coated onto the surface 52 of the substrate 50. The illustrative embodiment shows the pseudo-graphite 54 coated on two surfaces 52 of the substrate 50. In some embodiments, the pseudo-graphite is only coated on a single surface 52 of the substrate 50. In some embodiments, the pseudo-graphite 54 is coated around the substrate 50. The pseudo-graphite 54 may be modified with an electrochemically sensitive material 62 to alter a sensing property of the electrode 14 to enhance the electrode 14 for organic species detection.

As used in the present disclosure, "pseudo-graphite" refers to an allotrope of carbon that is graphite-like, but that has one or more improved properties as compared to graphite and to graphene. These improved properties may include fast heterogeneous electron transfer (HET) at a basal plane of the pseudo-graphite and/or corrosion resistance greater than graphite and graphene. In some embodiments, the pseudo-graphite may be a nanocrystalline-graphite that is in Stage-2 of Ferrari's amorphization trajectory between amorphous carbon and graphite. In some embodiments, the pseudo-graphite has a nanocrystallite size of 1.5 nm, as measured by X-Ray Diffraction (XRD). The pseudo-graphite may have a layered morphology but, in contrast to graphites and graphenes, has a resistance to monolayer exfoliation. Instead, pseudo-graphite typically exfoliates in thick films of several hundred monolayers at a time.

In some embodiments, the pseudo-graphite may have a sp2/sp3 carbon ratio of about 85/15. In other embodiments, the carbon content of the pseudo-graphite may include between 80-90% sp2 carbon and 10-20% sp3 carbon. In still other embodiments, the carbon content of the pseudo-graphite may include between 75-95% sp2 carbon and 5-25% sp3 carbon. By contrast, typical graphites and graphenes both are near 100% sp2 carbon. For clarity, the pseudo-graphite can contain additional elements besides carbon. For instance, some pseudo-graphites include about 11% hydrogen.

The appearance of pseudo-graphite may be similar to a crystalline graphite but differs in that both the basal and edge planes (EP) have facile heterogeneous electron transfer (HET) kinetics. The basal plane (BP) of graphites have a barrier to HET as these materials are zero-band gap semiconductors. On the other hand, structural defects within the molecular planes of BP pseudo-graphite may increase density of electronic states (DOS) near the Fermi-level with corresponding HET rates. With the Fe(CN)63-/4- redox probe, BP and EP pseudo-graphite have achieved a standard HET rate (k0) of 10-2 cm/s. Other distinguishing features can include slow hydrogen evolution kinetics and/or molecular planes that are impervious to sub-surface electrolyte intercalation, making the pseudo-graphite more resistant to corrosion than graphites and graphenes. These features can provide a wide electrochemical potential window of 3 V at 200 µA/cm2 in 1 M H2SO4, which surpasses other sp2 carbon electrodes by 1 V and provides pseudo-graphite similar properties to boron-doped diamond.

Illustrative examples of "pseudo-graphite," and methods of producing such materials, are disclosed in each of U.S. Pat. No. 9,691,556, U.S. Patent Application Publication No. 2012/0228555, and Humayun Kabir et al., "The sp2-sp3 carbon hybridization content of nanocrystalline graphite from pyrolyzed vegetable oil, comparison of electrochemistry and physical properties with other carbon forms and allotropes," published in Carbon, volume 144, pages 831-840. The entire disclosures of each of the foregoing references are incorporated herein by reference.

While the pseudo-graphite 54 itself possesses many advantageous electrochemical properties, modifying the pseudo-graphite 54 with other chemical groups may improve the range of functionality and efficacy of the pseudo-graphite 54 for various applications. Such functionalization can provide improved electrode characteristics for a variety of applications. One such type of application is the sensing of organic content for determination of chemical oxygen demand (COD).

Figure 3:
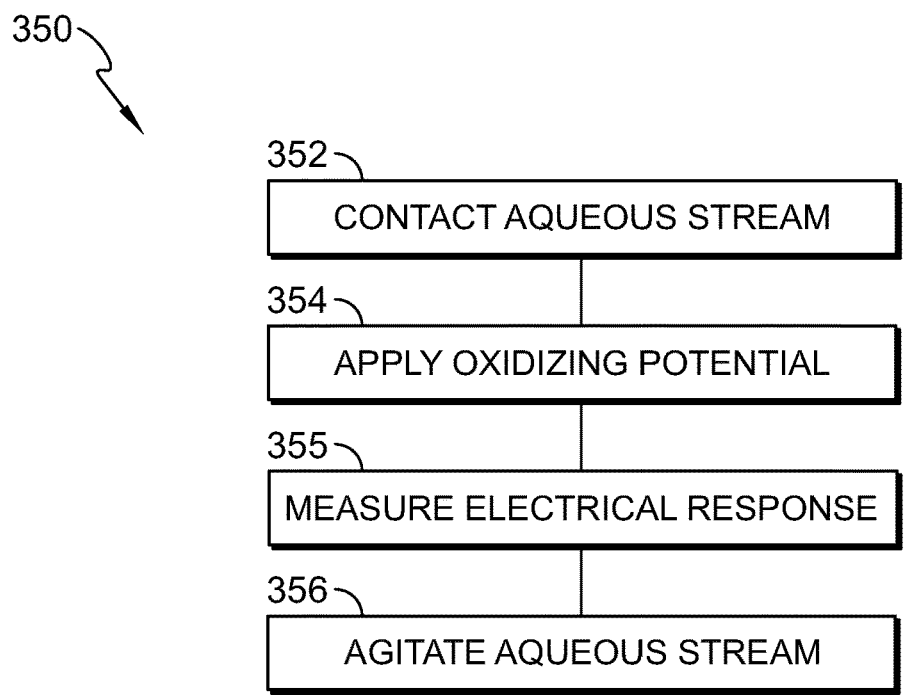
FIG. 3 is a flowchart of a method for determining chemical oxygen demand (COD) using the sensor device shown in FIG. 1.

Referring to FIG. 3, the pseudo-graphite 54 provides properties for chemical oxygen demand sensing and may be applied in a native, as-produced form, or in a surface-modified form for the determination of COD properties for aqueous streams following the method 350. At step 352, the pseudo-graphite 54 may be brought into contact with an aqueous stream to be tested. At step 354, a large oxidizing potential (typically 1.4V-2.6V vs. Ag/AgCl) may be applied versus a suitably chosen counter electrode 16. At step 355, the electrical response is measured. In some embodiments, the aqueous stream may be agitated (e.g. stirred), at block 356, to improve the reaction kinetics associated with the process. In some embodiments, the aqueous stream may be unagitated to enable the system to be measured under diffusion controlled conditions. In some embodiments, the aqueous stream may be agitated in between measurements to enable the system to be measured under diffusion controlled conditions wherein the initial state for each measurement is representative of the overall analyte concentration of the system. In some embodiments, the method 350 may be performed to the point of steady state surface concentration depletion of analyte to fully measure the COD parameter for the system. In other embodiments, the method 350 may be performed by using a particular potential function for a particular amount of time and the actual COD parameter for the system may then be extrapolated from these data.

Pseudo-graphite shows good efficacy for performing the method 350 with a range of organic species. However, undesirable results are sometimes obtained versus some organic species such as carboxylates. Such species may undergo secondary reactions (such as Kolbe reactions) which generate secondary chemistries which can create interferences with the signal which is desired for determination of COD.

Figure 4:
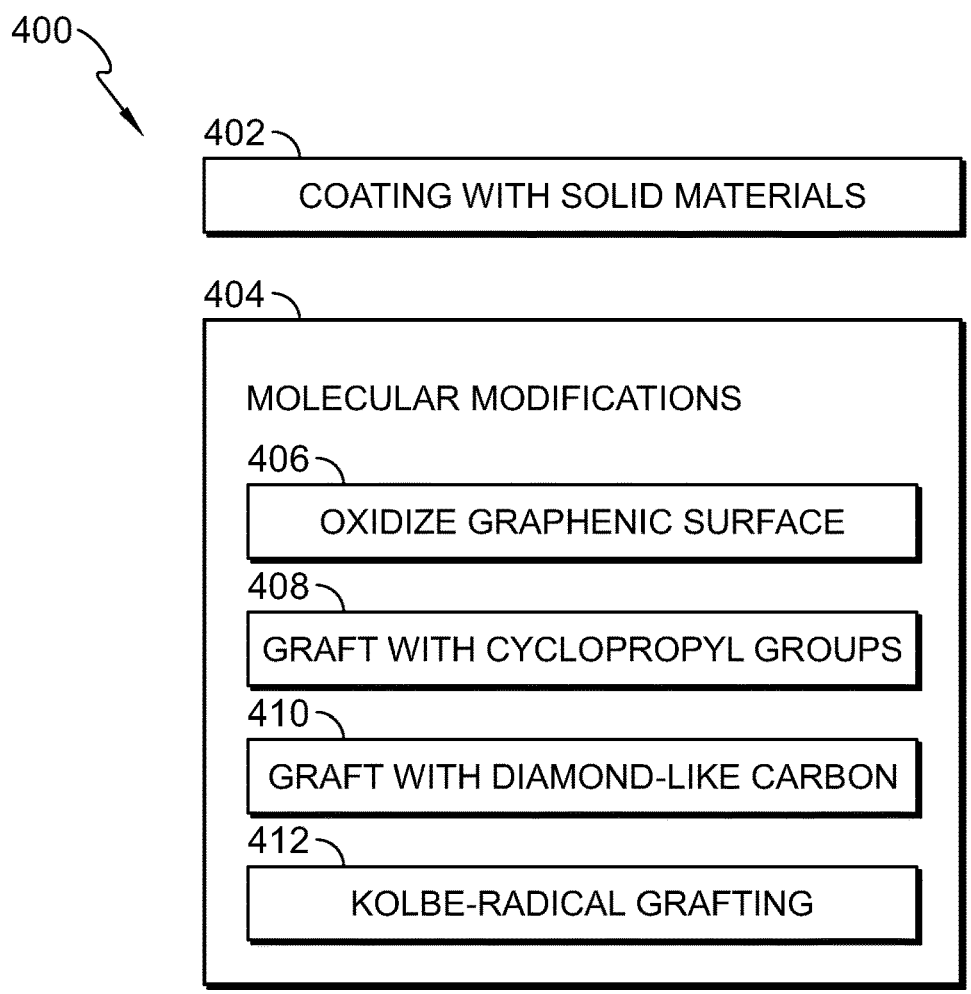
FIG. 4 is a flowchart of a method for modifying the pseudo-graphite surface of the working electrode shown in FIG. 1.

Referring now to FIG. 4, a method 400 is provided for several types of modification of the pseudo-graphite surface 60 properties to produce electrodes which have improved properties for COD sensing. In general, various techniques may be used to produce surface modifying groups. In some embodiments, the modifying groups may prevent Kolbelinkage of species to the pseudo-graphite surface 60 to enhance COD detection. In many preferred embodiments, the modified surface produced will itself be relatively stable versus the relatively large oxidizing potentials utilized for the method 350 of COD measurement.

At block 402, surface modifications may take the form of solid materials coated onto the pseudo-graphite surface 60 (e.g., films or nanoparticulates). One such solid surface modification is a coating of tin oxide (typically $SnO_n$, n~2) onto the pseudo-graphite surface 60 to form a hybrid dimensionally stable anode for COD measurement. Tin oxide may be applied as a solid, essentially-contiguous film. Alternatively, the tin oxide may be applied as discontinuous thin film of nanoparticles. Such films may be deposited by methods such as electrodeposition from precursors or electrophoretic deposition of premade particles. In some embodiments, and in particular for oxide deposited materials, when these materials are formed from liquid compositions, the film or nanoparticulate will be subjected to a heat treatment to modify the chemistry of the deposited materials, such as calcination.

At block 404, surface modifications may take the form of molecular modifications to the surface chemistry of the pseudo-graphite surface 60. In some embodiments, the modification is made by covalently linking moieties to the pseudo-graphite surface 60. At block 406, the pseudo-graphite surface 60 may be oxidized to form oxygen bearing groups (e.g., quinone-like groups). These groups are typically less susceptible to Kolbe-radical grafting and are also relatively robust versus further oxidative modification. At block 408, groups may be grated onto the pseudo-graphite surface 60. Illustratively, the cyclopropyl groups may be grated onto the pseudo-graphite surface 60. For example, perhalo-cyclopropyl groups may be grafted onto the pseudo-graphite surface 60. Such groups are generally less susceptible to Kolbe-radical grafting and the perhalo-cyclopropyl groups (e.g. dichlorocyclopropyl) are comparatively robust versus oxidative attack because they are already oxidized and generally more susceptible to electroreduction. In an illustrative embodiment, such species may be formed by the formation of dichlorocarbene radicals through reaction of chloroform with cetyltrimethylammonium hydroxide in an inert organic solvent and then the grafting of these radicals onto the pseudo-graphite surface 60.

At block 410, a very thin layer (approximately 1-5 monolayers) of diamond-like carbon (e.g., a carbon with a relatively higher sp3 content) may be grafted onto the pseudo-graphite surface 60. In some embodiments, the diamond-like carbon will be terminated with a species which is relatively robust versus further grafting and/or abstraction under conditions for measuring COD (e.g., oxidative abstraction, Kolbe-radical grafting/abstraction, etc.). Such termination species may include hydrogen terminated surfaces or halogen terminated surfaces (e.g. fluorinated surfaces). Such surfaces provide an electrode surface which performs very similarly to boron-doped diamond surfaces. Such surface films may be produced through the electroreduction of suitable halomethanes at the pseudo-graphite surface 60. For example, hydrogen terminated thin diamond-like films may be produced by the electroreduction of bromoform to remove all bromines in a dry, degassed nonreactive, aprotic solvent while fluorine terminated thin diamond-like films may be produced by the electroreduction of tribromofluoromethane to remove all bromines but not remove the fluorine in a dry, degassed, non-reactive, aprotic solvent.

At block 412, the pseudo-graphite surface 60 may be modified through a Kolbe-radical grafting reaction to saturate the pseudo-graphite surface 60. Such a modification may achieve an equilibrium value for the surface grafting reaction. For example, species such as phthalates and acetates can be electro-oxidized to form Kolbe radicals which will graft to the pseudo-graphite surface 60 and at saturation will protect it from further grafting. This can be utilized in an equilibrium condition to protect the system from Kolbe-grafting in aqueous streams containing similar (e.g. carboxylated) species.

Various types of surface modification may also be utilized together on a single electrode as appropriate. For example, the pseudo-graphite surface 60 may first be oxidized and then the surface may be grafted with dichlorocarbenes. In another embodiment, the pseudo-graphite surface 60 may first be decorated with a covering of tin oxide nanoparticles and then the pseudo-graphite surface 60 may be oxidized to produce a pseudo-graphite surface 60 with a significant coverage of oxygen bearing (e.g., quinone-like) moieties.

In some embodiments, the device 10 may be constructed as one or more working electrodes of chemistries which are well suited to providing high anodic potentials as described above and also one or more electrodes with chemistries tailored to function as counter electrodes and/or reference electrodes for the working electrodes. In some of these embodiments, the electrodes may have differentiated surface chemistries to enable the COD measurement to be more easily distinguished from potential interference effects. For instance, two different types of working electrodes (e.g., tin oxide decorated pseudo-graphite and surface oxidized pseudo-graphite) and two different types of counter electrodes (e.g. native pseudo-graphite and a hydrogen terminated diamond-like layer coated pseudo-graphite) and a reference electrode (e.g. pseudo-graphite functionalized with a stabilized ferrocenic moiety). By measuring the apparent COD signal generated across these electrode couples in various combinations the true COD signal may be more confidently extracted apart from potential interferences.

Furthermore, the device 10 may be constructed as part of an electrode system with other electrodes to detect other system parameters (such as conductivity, pH, etc.) to be able to account for these system parameters in determining the COD value. Moreover, in some embodiments all of these electrodes may advantageously be constructed onto a single substrate. In some embodiments, device 10 may include separate electrodes on an underlying insulating substrate.

In some embodiments, the device 10 may be constructed to in conjunction with additional devices to measure the species produced by the electro-oxidation process (e.g. such species as carbonates, nitrates, sulfates, etc.) to more fully characterize the chemistry of the device 10 (e.g. for measuring total organic content). For example, in one such measurement system, the device 10 may incorporate a de-gassing system (e.g., an $N_2$ sparging system) prior to the electro-oxidation treatment, and a pH sensor (to determine concentrations of entrained pH-affecting gases) plus gas extraction system after the electro-oxidation treatment (e.g., venturi nozzle gas extraction) and an infrared sensor incorporated to detect the quantity of certain gases (e.g., $CO_2$, $SO_2$, $NO_3$, etc.) resulting from the electro-oxidation treatment.

A modified form of pseudo-graphite with oxygen-bearing functionalities (e.g. quinone-like surface functionalities, hereinafter abbreviated as "q-pseudo-graphite") was examined as an anode for the sensing of chemical oxygen demand (COD). These oxygen-bearing groups were verified by FT-IR and x-ray photoelectron spectroscopies (XPS) along with cyclic voltammetry (CV). The XPS analysis indicated that the C/O atomic ratio of q-pseudo-graphite is 1.4/1. This is one of the highest abundances of oxygen on the surface of a carbon material reported in literature. The apparent capacitance as measured by CV of q-pseudo-graphite is 170 times greater in 1.0 M $H_2SO_4$ than the pristine material. This is attributed to the more complete wetting of the porosity of the surface of q-pseudo-graphite relative to the unmodified form. The $Fe(CN)_6^{3-/4-}$ redox probe was used to assess the effects of the oxygen-bearing groups on heterogeneous electron transfer at the surfaces of the pristine material and q-pseudo-graphite. The CV peak potential differences of 75 mV on pseudo-graphite and 90 mV on q-pseudo-graphite indicates a slightly higher barrier to electron transfer with this inner-sphere couple on the modified surface. The COD sensing performance of q-pseudo-graphite was quantified with glucose, potassium hydrogen phthalate (KHP), lactic acid, and sodium dodecyl benzenesulfonate (SDBS). At a constant potential of 1.6 V vs. Ag/AgCl q-pseudo-graphite anodes have the largest linear range of 0 to 10000 ppm (as glucose) reported in literature. The limit of detection (40 ppm) and sensitivity are competitive with other electrode systems.

Pseudo-graphite is an allotrope of carbon. While having morphological and spectroscopic similarities with graphites it differs in the electrochemical properties. These include fast heterogeneous electron transfer (HET) at the basal plane and excellent resistance to corrosion. With $Fe(CN)_6^{4-/3-}$ redox probe, the basal plane (BP) of pseudo-graphite has a standard rate constant ($k^0 \approx 10^{-2}$ cm/s) that commonly surpasses graphene, graphites, carbon nanotubes (CNT), boron-doped diamond (BDD) and diamond-like carbon (DLC) by 1 to 8 orders of magnitude. In 1 M $H_2SO_4$ the $sp^2$ hybridized carbon material pseudo-graphite has comparable anodic limits with $sp^3$ boron-doped diamond. In these aspects pseudo-graphite has possible applications as electrochemical sensors especially those requiring anodic stability.

Emerging techniques for COD determination include electrochemical methods, photocatalytic method, and ultraviolet, fluorescence, chemiluminescence, and photoelectrochemical spectroscopies. Electrochemical methods have received much attention due to the promise of a cost effective, portable, and rapid detector with continuous monitoring abilities and little or no sample preparation. This is through direct oxidation of the organics in aqueous electrolyte at an electrode via the following reaction:

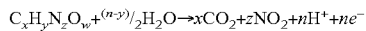

$$C_xH_yN_zO_w + {}^{(n-y)}/_2 H_2O \rightarrow xCO_2 + zNO_2 + nH^+ + ne^-$$

This process requires a corrosion resistant anode. Two different surfaces were examined for chronoamperometric COD sensing. These include pristine and electrochemically modified pseudo-graphite surfaces. For the latter, this was conducted by application of +2.1 V for 150 sec followed by 15 cyclic voltammetric cycles from −0.7 V to +1.0 V at 50 mV/s in 1.0 M $H_2SO_4$. This procedure functionalized the surface of pseudo-graphite with oxygen-bearing moieties (q-pseudo-graphite). The q-pseudo-graphite surface has a bluish hue relative to the metallic appearance of GUITAR). It is noteworthy that attempts at making oxygen-bearing functionalized graphite with similar properties under the same conditions for q-pseudo-graphite fails as it gives mechanically unstable expanded layers that exfoliate in solution. Unlike graphites, pseudo-graphite does not undergo a dimensional expansion by electrochemical oxidation. The basal planes of graphites is penetrated by electrolytes which under oxidative potentials evolve $CO_2$ and $O_2$ gases which cause blistering, expansion, and pit corrosion.

Figure 5:
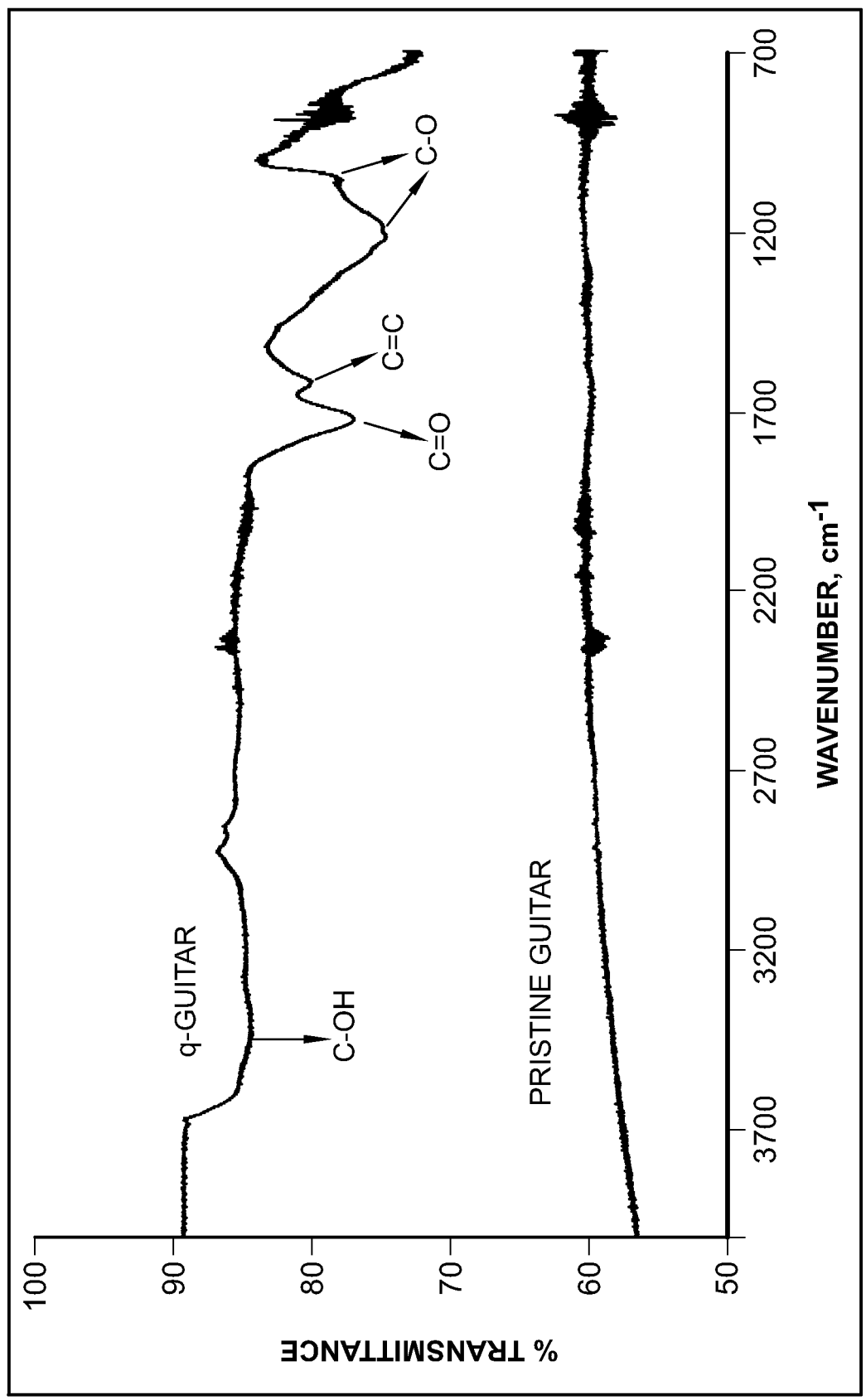
FIG. 5 is a graph of FT-IR spectra on pristine pseudo-graphite (bottom) and q-pseudo-graphite (top), wherein the peak assignments at 3700-3000, 1726, 1620, 1185 and 1063 cm$^{-1}$ are indicated in the figure.

Infrared and x-ray photoelectron spectroscopy (XPS) analyses indicate the attachment of oxygen containing functional groups on the surface of pseudo-graphite by the electrochemical treatment. The FT-IR spectra of pseudo-graphite and q-pseudo-graphite are shown in FIG. 5. The pristine material shows no discernable peaks while q-pseudo-graphite has features indicating broad signals at 3700-3000 $cm^{-1}$ and peaks at 1726, 1620, 1185 and 1063 $cm^{-1}$. These are attributed to C—O—H, C=O, aromatic C=C and C—O (1185 and 1063 $cm^{-1}$) respectively. The XPS spectra of pseudo-graphite and q-pseudo-graphite are shown in FIG. 6. The deconvolved C1s peak of pristine pseudo-graphite (FIG. 6B) indicates 95.9% carbon (85.0% C=C at 284.2 eV and 15.0% C—C at 285.4 eV). This material conforms to XPS of graphitic materials in the literature (See FIG. 7). The XPS of q-pseudo-graphite in FIG. 6D indicates a surface that consists of 41% oxides (19% C—O at 286.1 eV, 11.8% C=O at 287.4 eV and 10.2% COOH at 288.8 eV). The total oxide concentrations of 41% (C:O atomic ratio 1.4:1) for q-pseudo-graphite is one of the highest for an $sp^2$ carbon material. Literature graphene oxides (GO) range from 25 to 44% (see FIG. 7). It is important to note that GO materials are formed by the chemical oxidation of graphite which delaminates into separated oxidized graphene layers. This is from the electrolyte intercalation mechanism described above. These layers are reassembled by filtration forming layered graphene oxides. On the other hand, q-pseudo-graphite maintains its dimensional integrity during oxidation. This feature along with resistance to corrosion and fast HET rates at the BP are indicators that pseudo-graphite is a carbon allotrope distinct from graphite.

Figure 8:
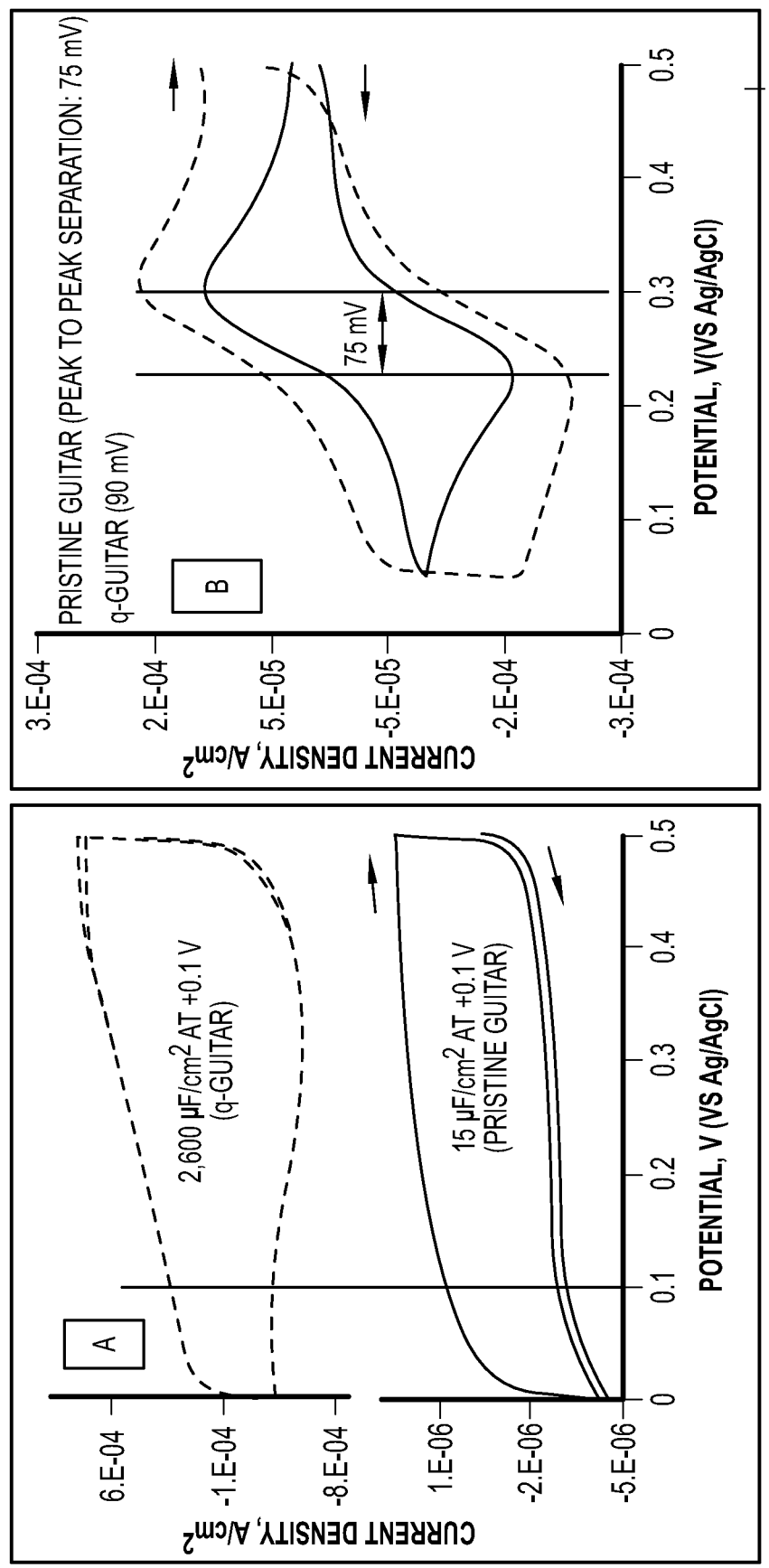
FIG. 8 includes a graph (A) of electrochemical double layer capacitance in 1.0 M H2SO4 and a graph (B) of peak to peak separation in 1.0 mM Fe(CN)63-/4- (in 1.0 M KCl) on pristine and q-pseudo-graphite surfaces at 50 mV/s.

In general, double layer capacitance is proportional to electrode surface area. This quantity was measured for pristine and q-pseudo-graphite in 1.0 M $H_2SO_4$ by cyclic voltammetry (FIG. 8A). Non-faradaic current (i) gives capacitance (C) through C=i/v, (where v is potential sweep rate). At 50 mV/sec, pristine pseudo-graphite has a double layer capacitance of 15 $\mu F/cm^2$ at +0.1 V, a value that is close to other graphitic materials. On the other hand, q-pseudo-graphite has a double layer capacitance of 2,600 $\mu F/cm^2$ at +0.1 V, corresponding to an increase of 170 times in effective surface area relative to pristine pseudo-graphite. Potentials above +0.2 V FIG. 8A contains the faradaic current arising from oxygen-bearing group functionalization and was not considered in the calculation for capacitance. As discussed above, pseudo-graphite is not subject to the corrosion mechanism endemic to graphites.

An atomic forces microscopy investigation of the basal plane of pseudo-graphite in a previous study indicates a wavy surface with random distribution of pores 10-50 nm in diameter and an amplitude of 20 nm. It is believed that insertion of oxygen containing groups on the surface of basal plane of pseudo-graphite increases hydrophilicity and allows aqueous electrolyte to fully wet these pores on q-pseudo-graphite.

The COD sensing scheme relies on HET via the reaction shown above. In general, the basal plane of pseudo-graphite has excellent HET rates for $Fe(CN)_6^{3-/4-}$ which matches those of the edge plane graphitic materials. In order to assess how the formation of oxygen-bearing functionalities affect HET rates, cyclic voltammetric (CV) studies with $Fe(CN)_6^{3-/4-}$ on q-pseudo-graphite electrodes were conducted. FIG. 8B illustrates the CV studies. The potential peak to peak ($\Delta E_p$) separations of 75±10 mV (n=10) and 90±10 mV (n=10) correspond to the basal planes of pseudo-graphite and q-pseudo-graphite respectively. These values are statistically different at the 95% confidence level by the t-test. The pristine material behaves as previously described. The $\Delta E_p$ for q-pseudo-graphite at its basal plane is indicating slightly slower HET rates for the $Fe(CN)_6^{3-/4-}$ redox couple. On other graphitic electrodes, this species is described as being insensitive to surface oxides and not requiring adsorption. On the other hand, $Fe(CN)_6^{3-/4-}$ may be an inner-sphere which is dependent on surface functionalities of graphite electrode.

Figure 9:
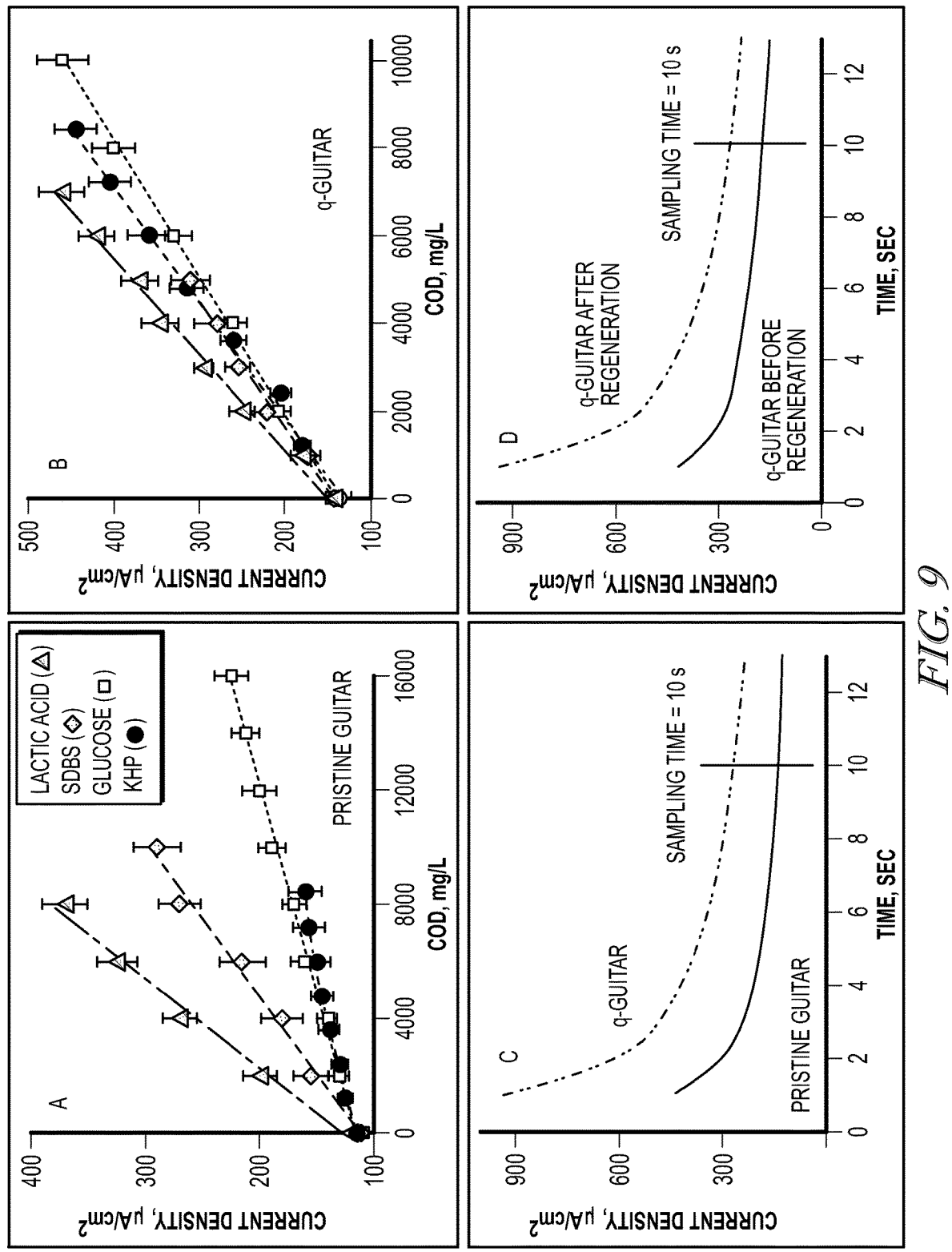
FIG. 9 includes a graph (A) of determination of chemical oxygen demand (COD) with glucose, potassium hydrogen phthalate (KHP), lactic acid, and sodium dodecyl benzenesulfonate (SDBS) on pristine pseudo-graphite, a graph (B) of determination of chemical oxygen demand (COD) with glucose, potassium hydrogen phthalate (KHP), lactic acid, and sodium dodecyl benzenesulfonate (SDBS) on q-pseudo-graphite at +1.6 V in 0.1 M Na2SO4 (n=5), a graph (C) of amperometric responses of 4000 mg/L COD (glucose) on pristine pseudo-graphite, and a graph (D) of amperometric responses of 4000 mg/L COD (glucose) on q-pseudo-graphite and aged and regenerated q-pseudo-graphite at +1.6 V in 0.1 M Na2SO4.

Four surrogates for chemical oxygen demand (COD) were investigated. These included glucose, potassium hydrogen phthalate (KHP), lactic acid, and sodium dodecyl benzene-sulfonate (SDBS). All were selected based on their common usage in the literature. Chronoamperometric studies via the reaction shown above were conducted at +1.5 V in 0.1 M $Na_2SO_4$ solution on the pristine and q-pseudo-graphite surfaces. The responses are shown in FIGS. 9(A and B). Chronoamperometric responses were measured at 1.5, 1.6, 1.8 and 2.0 V. The optimal electrode potential was selected based on background signal and sensitivity considerations. In FIG. 9C it is evident that q-pseudo-graphite has a more sensitive current response for glucose at 1.6 V over the unmodified electrode. The current signal at 10 seconds is approximately 85% greater (from 140 to 260 $\mu A/cm^2$) for 4000 mg/L COD (glucose). The balance of the investigation was therefore concentrated on q-pseudo-graphite. Although the HET rate for q-pseudo-graphite was found to be slower for $Fe(CN)_6^{4-/3-}$ than unmodified pseudo-graphite, complete wetting of the surface may have an important role for adsorption and electro-oxidation of organics via the reaction shown above.

Surface fouling and signal loss is associated with the adsorption of organics. This is evident with q-pseudo-graphite by the subsequent re-measurement with the same surface which shows a decayed response of 170 from 260 $\mu A/cm^2$ (FIG. 9D). Pristine pseudo-graphite surfaces experienced a similar fouling phenomenon. Regeneration was conducted by application of +1.6 V for 2 minutes followed by −0.7 V for 3 minutes in 0.1 M $Na_2SO_4$. This procedure is necessary to produce the calibration curves of all four COD surrogates in FIG. 9A (pristine) and FIG. 9B (q-pseudo-graphite). From FIG. 9A it is evident that the sensitivities (slopes) of the response of each surrogate differs on the pristine pseudo-graphite. This problematic feature is observed with other electrochemical COD detectors in the literature. On the other hand, differences in the sensitivities between each of the four COD surrogates (FIG. 9B) is somewhat alleviated with the use of q-pseudo-graphite. The slopes varied from 0.046 ($\mu A \cdot mg\ COD/cm^2 \cdot L$) for lactic acid to 0.032 for glucose.

FIG. 10 summarizes the results of COD detection with q-pseudo-graphite and those in literature. It is apparent from that table that the linear range of the q-pseudo-graphite anode is among the highest in literature. This adds flexibility in applications as COD concentrations for industrial and domestic effluents vary from 400-65,700 and 300-1000 mg/L, respectively. Depending on the country and industry the COD limit in the industrial discharged wastewater is 75-34,000 mg/L. The limit of detection (LOD) of the q-pseudo-graphite anode of 40 ppm for glucose is therefore competitive in the literature and applicable to monitoring COD.

The pseudo-graphite and q-pseudo-graphite anodes require surface regeneration between each COD analysis for the calibration curves in FIGS. 9A and 9B. This regeneration sequence is successful for approximately ten sampling points. When that number is exceeded, spontaneous exfoliation of the topmost layers (approximately 10 to 100 nm) of q-pseudo-graphite anodes were observed. The freshly exposed layers have a metallic appearance similar to pristine pseudo-graphite and had the same cyclic voltammetric $Fe(CN)_6^{4-/3-}$ peak potential separation ($\Delta E_p$) of 75±10 mV.

Figure 11:
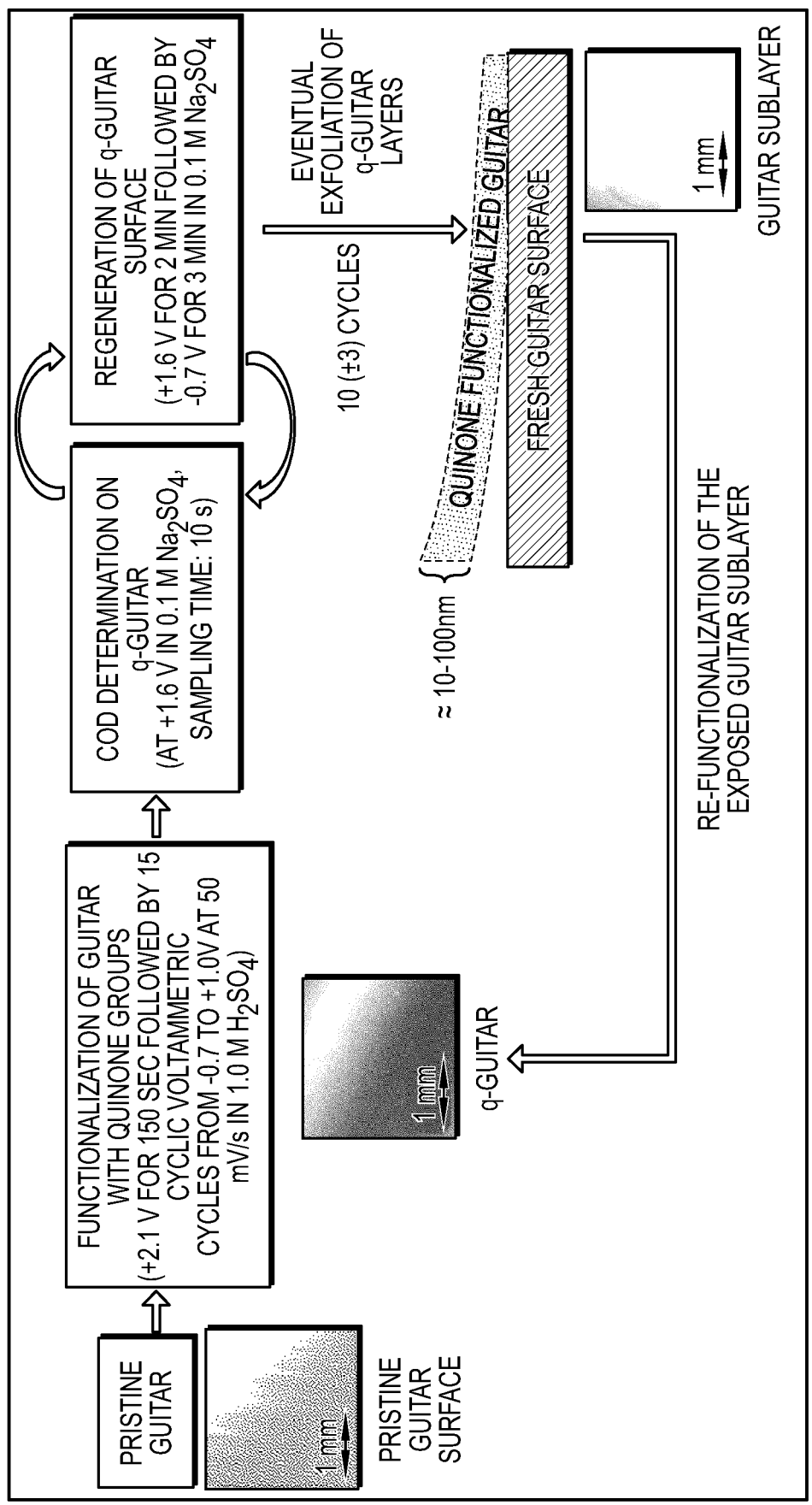
FIG. 11 is a flow chart showing the generation of q-pseudo-graphite, surface regeneration between each COD analysis, exfoliation after 10(±3) cycles and reformation of q-pseudo-graphite.
Figure 13:
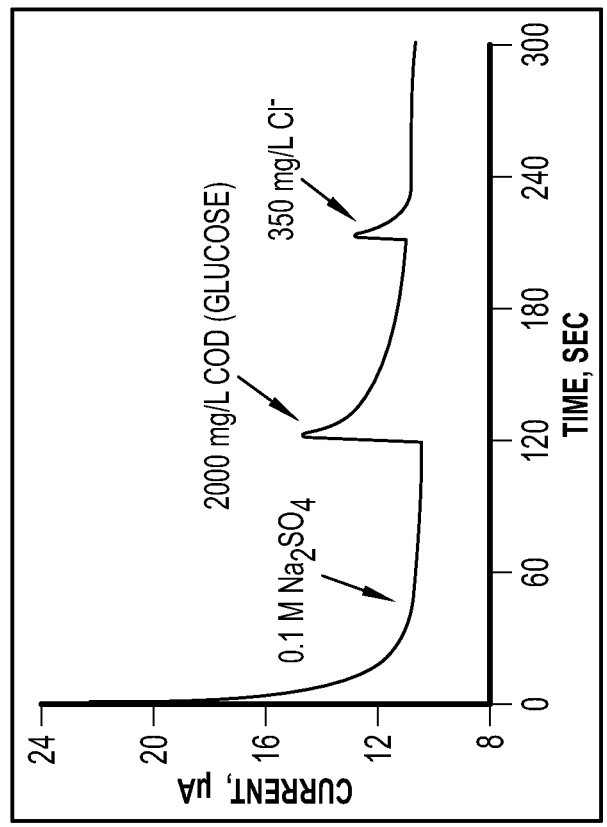
FIG. 13 is a graph of interference of chloride on COD detection with q-pseudo-graphite anode held at +1.6 V in 0.1 M Na2SO4.

FIG. 11 illustrates the entire q-pseudo-graphite sensor anode sequence from formation to COD sensing-regeneration, spontaneous exfoliation and re-functionalization back to q-pseudo-graphite. This is the only known exfoliation method for pseudo-graphite as mechanical exfoliation with cellophane tape is not possible with either pseudo-graphite or q-pseudo-graphite, although optical, transmission and scanning electron micrographs show clear layered structure. It is hypothesized that inter-planar bonds prevent electrolyte intercalation driven delamination processes thus increasing the corrosion resistance of pseudo-graphite relative to graphite. The rigors of COD sensing and regeneration may break these bonds leading to spontaneous exfoliation.

Figure 12:
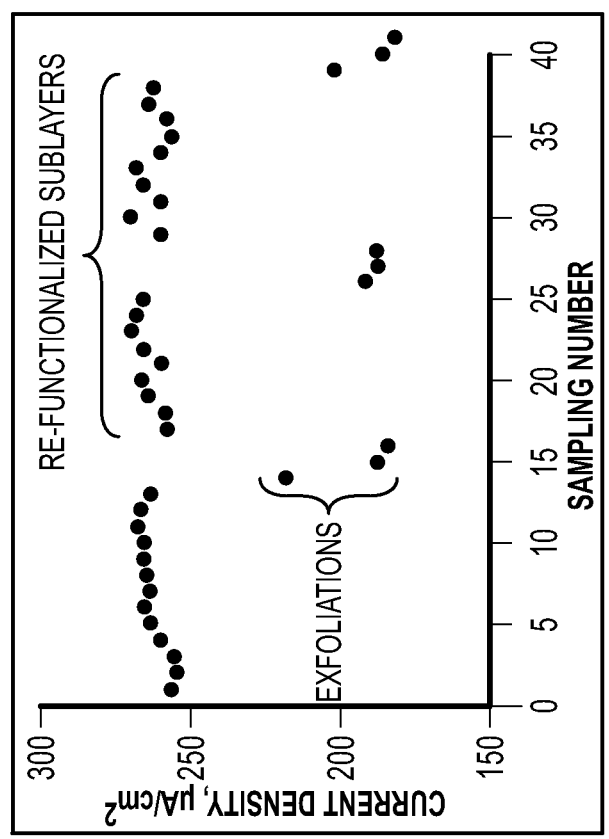
FIG. 12 is a graph of the 10-second chronoamperometric response (approximately 260 µA/cm2) of q-pseudo-graphite with 4000 mg/L COD (glucose) in 0.1 M Na2SO4 at +1.6 V, wherein after 13 COD measurements, the q-pseudo-graphite exfoliates giving the response of pristine pseudo-graphite (approximately 180 µA/cm2), wherein the freshly exposed pseudo-graphite sublayer is re-functionalized and used for further COD determination.

The response of the re-functionalized q-pseudo-graphite surface is demonstrated in FIG. 12. The first 13 COD analyses gave a nearly constant signal. That signal was lost on the next few runs upon exfoliation of q-pseudo-graphite layers where it converges the signal of pristine pseudo-graphite. Re-functionalization returns the current response to the levels of q-pseudo-graphite. After an additional nine COD analyses there is another subsequent exfoliation event. That electrode surface was re-functionalized to q-pseudo-graphite with its respective response. It is contemplated that this process can be repeated through the bulk of the pseudo-graphite until it is consumed.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the methods, systems, and articles described herein. It will be noted that alternative embodiments of the methods, systems, and articles of the present disclosure may not include all of the features described yet still benefit from at least some of the advantages of such features. Those of ordinary skill in the art may readily devise their own implementations of the methods, systems, and articles that incorporate one or more of the features of the present disclosure.

The invention claimed is:

1. A method comprising:
   coating a pseudo-graphite electrode material onto a surface of an electrode substrate to produce a pseudo-graphite surface;
   modifying the pseudo-graphite surface with an electrochemically sensitive material to limit organic content in a sample from generating secondary surface chemistries when the pseudo-graphite surface is exposed to the organic content to enhance detection of the organic content; and
   exposing the pseudo-graphite surface to the sample to detect the organic content in the sample.

2. The method of claim 1, wherein modifying the pseudo-graphite surface comprises coating the pseudo-graphite surface with tin-oxide to enhance the electrode for detecting organic content.

3. The method of claim 1, wherein modifying the pseudo-graphite surface comprises oxidizing the pseudo-graphite surface to produce oxygen bearing groups to enhance the electrode for detecting organic content.

4. The method of claim 1, wherein modifying the pseudo-graphite surface comprises grafting the pseudo-graphite surface with cyclopropyl groups to enhance the electrode for detecting organic content.

5. The method of claim 1, wherein modifying the pseudo-graphite surface comprises grafting the pseudo-graphite surface with diamond-like carbon to enhance the electrode for detecting organic content.

6. The method of claim 1, wherein modifying the pseudo-graphite surface comprises:
covering the pseudo-graphite surface with tin oxide nanoparticles to produce a decorated surface, and
oxidizing the decorated surface.

7. The method of claim 1, wherein the pseudo-graphite has fast heterogeneous electron transfer at a basal plane.

8. The method of claim 1, wherein the pseudo-graphite has a corrosion resistance greater than graphitic materials.

9. The method of claim 1, wherein a carbon content of the pseudo-graphite includes 80-90% sp2 carbon and 10-20% sp3 carbon.

10. An electrode comprising:
an electrode substrate with a surface, and
a pseudo-graphite electrode material coated onto the surface of the electrode substrate to produce a pseudo-graphite surface for detecting organic content, wherein the pseudo-graphite surface has been modified with an electrochemically sensitive chemistry to limit the organic content from generating secondary surface chemistries when the pseudo-graphite surface is exposed to the organic content to enhance the electrode for detecting the organic content.

11. The electrode of claim 10, wherein the pseudo-graphite surface is coated with tin-oxide to enhance the electrode for detecting organic content.

12. The electrode of claim 10, wherein the pseudo-graphite surface is oxidized to produce oxygen bearing groups to enhance the electrode for detecting organic content.

13. The electrode of claim 10, wherein diamond-like carbon is grafted onto the pseudo-graphite surface to enhance the electrode for detecting organic content.

14. The electrode of claim 10, wherein the pseudo-graphite surface is modified through a Kolbe-radical grafting reaction to enhance the electrode for detecting organic content.

15. The electrode of claim 10, wherein:
the pseudo-graphite surface is covered with tin oxide nanoparticles to produce a decorated surface, and
the decorated surface is oxidized.

16. A sensor comprising:
an electrode comprising an electrode substrate and a pseudo-graphite material coated onto a surface of the electrode substrate to produce a pseudo-graphite surface, the pseudo-graphite surface of the electrode to be exposed to a sample to detect organic content in the sample, wherein the pseudo-graphite surface is modified with an electrochemically sensitive chemistry to limit the organic content in the sample from generating secondary surface chemistries when the pseudo-graphite surface is exposed to the organic content to enhance the electrode for detecting organic content;
an electrical source to supply at least one of a current or voltage to the electrode, and
a measurement circuit to measure a resultant signal from the electrode.

17. The sensor of claim 16, wherein:
the electrode is a first electrode configured to detect a first organic content; and
the sensor further comprises a second electrode configured to detect a second organic content.

18. The method of claim 1, wherein the sample is from an aqueous stream and the organic content comprises carboxylates, wherein the method comprises modifying the pseudo-graphite surface with the electrochemically sensitive material to limit Kolbe-radical grafting of the pseudo-graphite surface when the pseudo-graphite surface is exposed to the carboxylates in the sample.

19. The method of claim 18, further comprising determining the chemical oxygen demand of the aqueous stream.

20. The electrode of claim 10, wherein the pseudo-graphite surface of the electrode is to be exposed to a sample to detect carboxylates in the sample, wherein the pseudo-graphite surface is modified with the electrochemically sensitive chemistry to limit Kolbe-radical grafting of the pseudo-graphite surface when the pseudo-graphite surface is exposed to the carboxylates in the sample.

21. The sensor of claim 16, wherein the pseudo-graphite surface of the electrode is to be exposed to the sample to detect carboxylates in the sample, wherein the pseudo-graphite surface is modified with the electrochemically sensitive chemistry to limit Kolbe-radical grafting of the pseudo-graphite surface when the pseudo-graphite surface is exposed to the carboxylates in the sample.

\* \* \* \* \*